(12) United States Patent
Nakanishi et al.

(10) Patent No.: US 8,478,013 B2
(45) Date of Patent: Jul. 2, 2013

(54) AUTOMATIC MOTION MAP GENERATION IN HELICAL CT

(75) Inventors: Satoru Nakanishi, Tochigi-ken (JP); Be-Shan S. Chiang, Buffalo Grove, IL (US)

(73) Assignees: Kabushiki Kaisha Toshiba, Tokyo (JP); Toshiba Medical Systems Corporation, Tochigi-Ken (JP)

( * ) Notice: Subject to any disclaimer, the term of this patent is extended or adjusted under 35 U.S.C. 154(b) by 636 days.

(21) Appl. No.: 12/787,166

(22) Filed: May 25, 2010

(65) Prior Publication Data

US 2011/0293155 A1 Dec. 1, 2011

(51) Int. Cl.
*G06K 9/00* (2006.01)
*A61B 6/00* (2006.01)

(52) U.S. Cl.
USPC ............................... 382/131; 382/128; 378/4

(58) Field of Classification Search
USPC ........................................ 382/128–134; 378/4
See application file for complete search history.

(56) References Cited

U.S. PATENT DOCUMENTS 5,963,614 A * 10/1999 Hu et al. .......................... 378/15
2004/0125908 A1* 7/2004 Cesmeli et al. .................... 378/4
2006/0178575 A1* 8/2006 Piacsek et al. ................. 600/413

OTHER PUBLICATIONS

Hsieh, Jiang et al, "Step-and-shoot Cardiac Imaging with Optimal Temporal Gating and Reconstruction", 9th International Meeting on Fully Three-Dimensional Image Reconstruction in Radiology and Nuclear Medicine, pp. 253-256, (2007).
Manzke, R., et al., "Automatic phase determination for retrospectively gated cardiac CT", Medical Physics vol. 31, No. 12, pp. 3345-3362, (2004).
Hoffmann, Martin H.K., et al., "Automatic determination of minimal cardiac motion phases for computed tomography imaging: initial experience", Eur Radiol, 16: 365-373, (2006).
Ota, Takamasa et al., "Clinical usefulness of automatic phase selection in coronary CT angiography (CTA)", Medical Imaging 2007: Physics of Medical Imaging, Proc. of SPIE vol. 6510, 65102N1-N9, (2007).

* cited by examiner

*Primary Examiner* — Joseph Burgess
(74) *Attorney, Agent, or Firm* — Yoshida & Associates, LLC

(57) ABSTRACT

As an illustration of generating a motion map, although the cardiac CT is described for selecting an optimal phase, the disclosure is not limited to the cardiac CT. For the cardiac CT, the cardiac phase map is efficiently generated based upon helical scan data, and the optimal phase is selected within a reasonable time. At the same time, the optimal phase is accurately determined based upon complementary rays as indexes for minimal movement so as to select the projection data for minimizing artifacts in reconstructed cardiac images. The helically scanned data reflect motion within the same cardiac cycle or over the continuous cardiac cycles. The application of the complementary ray technique to the helically scanned data is accomplished by three-dimensionally determining a pair of the complementary rays in order to take into account motion within the same cardiac cycle or over the continuous cardiac cycles. The absolute sum of the differences for the top ray and or the bottom ray is determined in order to determine the amount of cardiac motion.

20 Claims, 14 Drawing Sheets

ON y-z PLANE:

ON x-y PLANE:

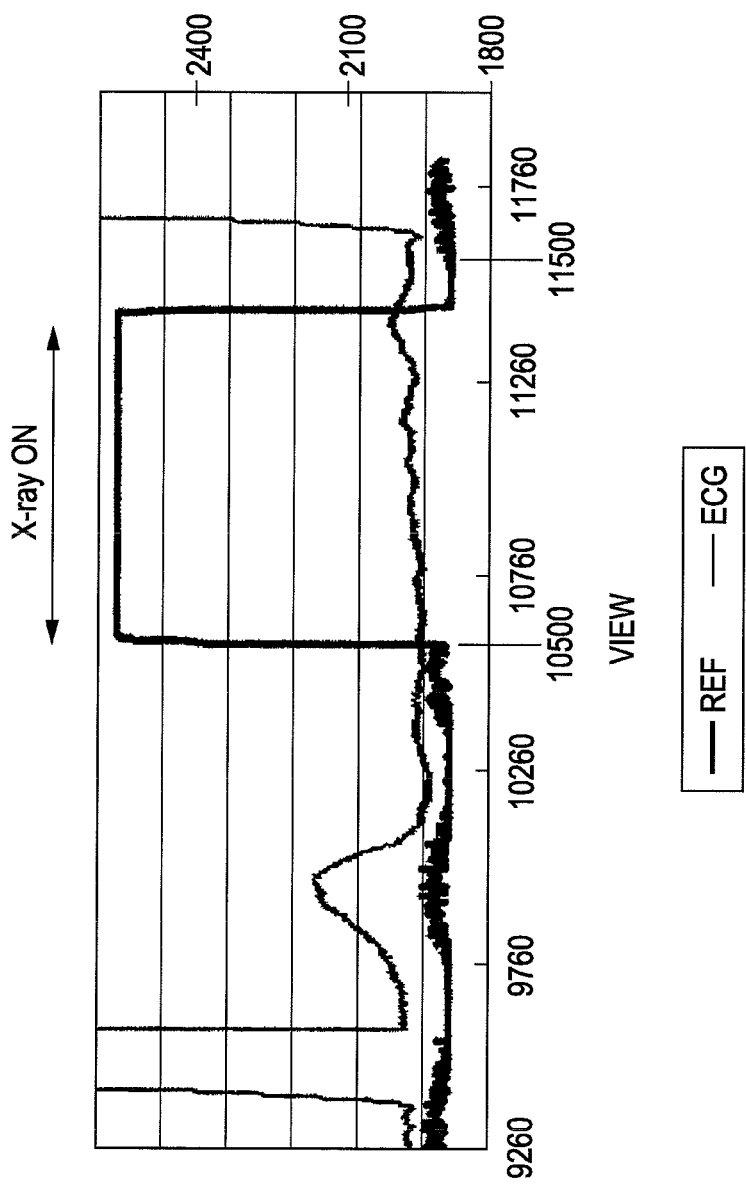

AUTOMATIC MOTION MAP GENERATION IN HELICAL CT

FIELD

The current invention is generally related to automatic generation of a motion map to be used with a helical data acquisition technique in computer tomography (CT).

BACKGROUND

For the coronary CT, modern CT scanners whose detector rows are ranging from 64 to 80 need to select a temporary reconstruction window in the acquired data since the entire heart organ cannot be scanned at the same location. In the absence of state-of-art multislice CT such as having 320 rows of detectors to scan the entire heart, it is thus necessary to generate a cardiac phase map in order to select a certain portion of projection data that corresponds to the optimal cardiac phases before reconstructing cardiac images that are substantially free from artifacts due to motion of the heart.

It has been well known that the optimal cardiac phases are generally periodic and may be near an end of the systolic phase and near a mid-point of the diastolic phase in the cardiac cycle. In these optimal cardiac phases, the heart experiences a relatively small amount of motion. To determine the optimal cardiac phases, one exemplary method is to use electrocardiogram (ECG) relative to R-to-R interval. Although ECG has been used both to trigger the date acquisition and to select the optimal reconstruction window, ECG represents the electrical signal of the heart and generally does not necessarily represent the mechanical state of the heart or the cardiac motion.

Unfortunately, it remains challenging to consistently find the optimal cardiac phases for reconstruction among patients since they depend upon patient-to-patient variability as well as inter-cycle variability of the same patient. That is, since the exact optimal cardiac phases within the cardiac cycle vary from one patient to another, there is no single quantitative method to determine the exact optimal cardiac phases among the patients. Furthermore, the optimal cardiac phases may vary within the same patient due to certain factors including an irregular heart rate such as arrhythmia. For the above reasons, a patient-specific cardiac phase map is generated in order to select a certain portion of projection data that corresponds to the optimal cardiac phases before reconstructing substantially artifact-free cardiac images for a particular patient.

In most prior art techniques, the heart is assumed to be moving in a uniform manner over various parts of the organ. Although the heart movement is complex and not necessarily uniform over the organ, the assumption simplifies the complex nature of the heart movement so that when an optimal phase is selected, the heart experiences the least amount of movement and a corresponding view is at least substantially free from movement regardless of a location in the heart.

In general, in comparison to a relatively short scan time using high-speed multislice helical CT, the post-scan time needed to select an optimal cardiac phase accounts for a large percentage of the coronary CT angiography examination time. Prior art selection techniques have attempted to reduce the above phase selection time while maintaining the accuracy in selecting the optimal cardiac phase for the image reconstruction.

Many prior art selection techniques rely on the image domain. That is, the optimal cardiac phase is determined based upon image data that are reconstructed from the original projection data or raw data. For example, low-resolution images have been reconstructed through the cardiac cycle after the coronary helical scan using a contrast-enhancement agent. Based upon the low-resolution images, periods of the least differences were selected between the neighboring phases indicating minimal cardiac motion. Although the low-resolution image data such as 64×64×64 voxels are reconstructed, these prior art techniques were not efficient due to the above time-consuming calculation during the reconstruction. Furthermore, these prior art techniques also suffered large cone angle problems and could not give accurate results at high-pitch helical scan.

Another prior art technique reduced the phase selection time based upon an automatic cardiac phase selection algorithm. In stead of the image domain, Ota et al. calculated the absolute sum of the differences between two raw helical scan data sets for subsequent cardiac phases and generated a velocity curve representing the magnitude of cardiac motion velocity for the entire heart volume. FIG. 1 illustrates partial row data at a target slice position along the axial plane including all four cardiac chambers (right atrium, right ventricle, left atrium, and left ventricle) indicated by a horizontal line. Since multi-slice computer tomography (MSCT) systems have multiple detector rows, the raw data corresponding to the amount of time required as the detector rows passed through the target slice position were generated by performing helical interpolation between detector rows. The helically interpolated raw data were consecutive dynamic scan raw data in the time axis direction at the same couch position while the raw data containing different timing information (cardiac phases) were obtained by extracting the raw data corresponding to a half scan from the sequential raw data according to the ECG-gating signals (timing shift technique). FIG. 1 also illustrates the partial raw data at cardiac phases of 0%, 10%, and 20%. These partial data correspond to the same couch position as the target slice position, but have different timing information. By the same token, the cardiac motion velocity of the heart is extracted at intervals of 2% by obtaining the sum of absolute values of the differences (SAD) at intervals of 4% for the raw data obtained at intervals of 2%.

The above prior art technique has improved one aspect in efficiency but has left other aspects unimproved. For example, the SAD was calculated from two chunks of views corresponding to adjacent phases, and the velocity curve was derived from the SAD. Furthermore, since the sinogram data is generated from interpolated rows in the measured data (i.e., it did not consider a cone angle), as the cone angle and the helical pitch increased, the sinogram became less accurate in comparison to the real measured data. Thus, SAD according to the Ota et al. prior art technique failed to accurately determine the optimal phase.

The previously discussed prior art techniques commonly utilized low pitch settings, raging from 0.1 to 03 for helical scan. These low pitch settings also translated to a higher x-ray dose to patients since regions exposed to the x-ray radiation are highly overlapped. From patient safety, a low dosage level is desired particularly for a repeated necessity for CT imaging.

In view of the above prior art problems, another technique is based upon step-and-shoot (SAS) cardiac imaging for determining the optimal cardiac phase for gating and reconstruction. That is, in one exemplary SAS data acquisition, the patient table remains stationary at one location while the x-ray tube and gantry rotate about the patient so that 64 slices are simultaneously collected. When irregular heart rate such as arrhythmia is encountered during the data acquisition, the data acquisition continues at the same location for the next normal heart cycle. After the data acquisition is completed for the one location, the table is stepped to the next location for a subsequent scan. For each step, the table traveled over 40 mm, which is roughly equal to the x-ray beam width, and little overlap is encountered in the exposure. Because the use of circular scan SAS data is proposed instead of helical scan data, the prior art technique reduced x-ray exposure to the patient and overcame some of the longitudinal truncation problems associated with helical scan data.

The above prior art technique utilized the conjugate samples to determine an amount of the heart motion. The conjugate samples were also each a pair of complementary rays as seen in the raw projection data. For a set of fan-beam data set, a pair of conjugate samples was defined by ($\gamma$, $\beta$) and ($-\gamma$, $\beta+\pi+2\gamma$), where $\gamma$ and $\beta$ were respectively the fan angle and the projection angle. If $\gamma_m$ were used to denote the maximum fan angle, the minimum cone beam data collection would be carried out in the view range of $\pi+2\gamma_m$. The entire dataset was searched through to identify all the conjugate samples, and the total absolute difference was calculated as below:

$$\xi(\beta_0) = \int_{-\gamma_m}^{\gamma_m} \int_{\beta_0}^{\beta_0+\Pi} |p(\gamma,\beta) - p(-\gamma,\beta+\Pi+2\gamma)| d\gamma d\beta$$

where $\Pi << \pi+2\gamma_m$ was the angular range of the consistency condition evaluation. Since the quantity $\xi(\beta_0)$ indicated the degree of inconsistency amongst all evaluated conjugate samples and the conjugate samples represented line integrals along the same path, the consistency, $\xi$, is a measure of the heart motion.

The above prior art utilized the conjugate samples in the SAS data to reduce the patient dosage exposure and to improve in determining the cardiac motion. On the other hand, the SAS technique has its disadvantages. Although the cardiac cycle is continuous, the SAS technique cannot capture the continuous cardiac cycle since the data acquisition is discontinuous over the various locations over the heart. After the data acquisition at a first location, no data is acquired while the patient table is stepped to a subsequent location. That is, the SAS data are not collected within the same cardiac cycle or over the continuous cardiac cycles. Furthermore, the projection data using the SAS technique may have overlapping portions or missing portions due to alignment of the projection angle. Lastly, if a contrast agent is used, these discrete delays between actual data acquisitions may not reflect the gradually declining effectiveness of the contrast agent.

In view of the above disadvantages, the helical data appear to be advantageous for the determination of the optimal cardiac phases in reconstruction. While the use of the conjugate samples also appears efficient in determining the optimal cardiac phases, the conjugate samples is limited to the SAS data and cannot be applicable to the helical data.

In summary, among the prior art attempts of generating cardiac phase maps, certain disadvantages remain to be desired. These disadvantages include efficiency, artifacts and helical scanning limitations. To generally improve these disadvantages in the cardiac CT application, the cardiac phase map must be efficiently generated, and a desirable phase should be selected within a reasonable time. At the same time, the optimal phase selection should be accurately determined so as to minimize artifacts in reconstructed images. Lastly, the projection data should be helically acquired in order to continuously reflect motion over the cardiac cycle.

BRIEF DESCRIPTION OF THE DRAWINGS

FIG. 10B is an enlarged portion of the graph in FIG. 10A according one embodiment of the current invention.

DETAILED DESCRIPTION

As an illustration of generating a motion map, although embodiments using the cardiac CT will be described for selecting an optimal phase, the current invention is not limited to the cardiac CT. In one embodiment of the cardiac CT, the cardiac phase map is efficiently generated based upon helical scan data, and the optimal phase is selected within a reasonable time. At the same time, embodiments of the current invention accurately determine the optimal phase based upon complementary rays which are used to generate indexes for minimal movement so as to select the projection data for minimizing artifacts in reconstructed cardiac images. The helically scanned data reflect motion within the same cardiac cycle or over the continuous cardiac cycles. The application of the complementary ray technique to the helically scanned data is accomplished by three-dimensionally determining a pair of the complementary rays in order to take into account motion within the same cardiac cycle or over the continuous cardiac cycles. The absolute sum of the differences for the top ray and or the bottom ray is determined in order to determine the amount of cardiac motion.

Figure 1:
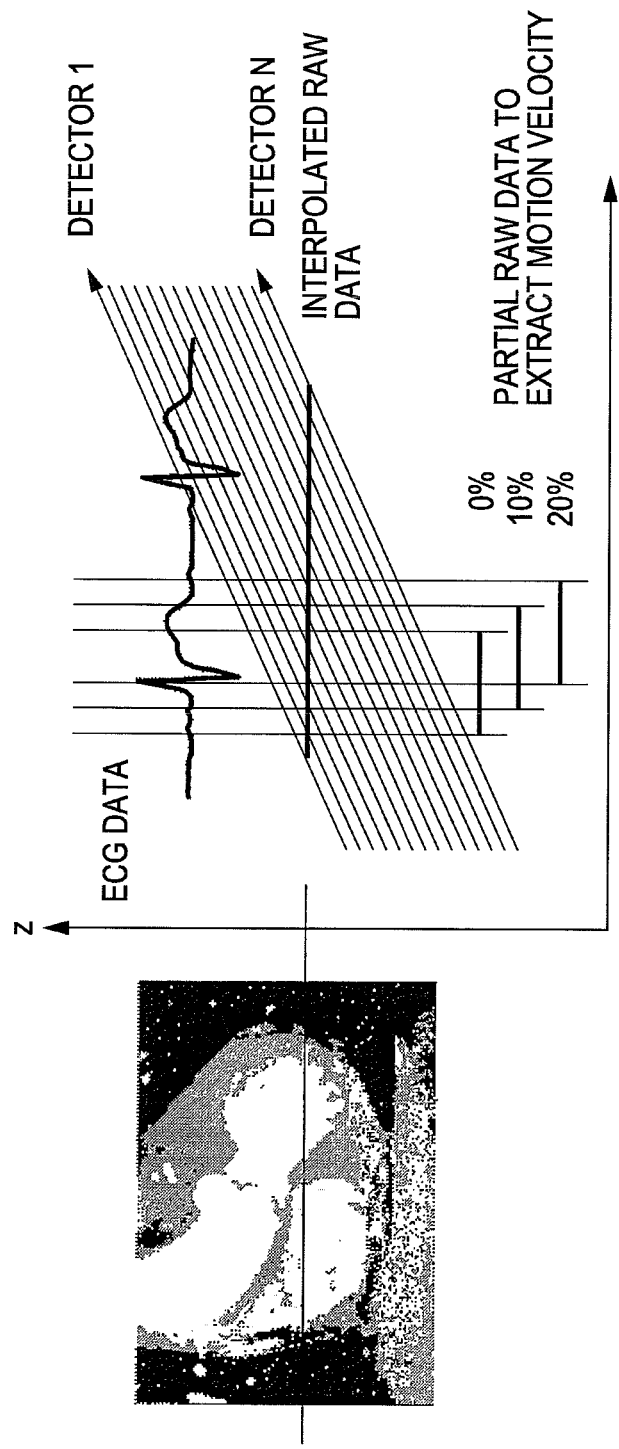
FIG. 1 illustrates a prior art technique using raw data obtained by helical interpolation.
Figure 2:
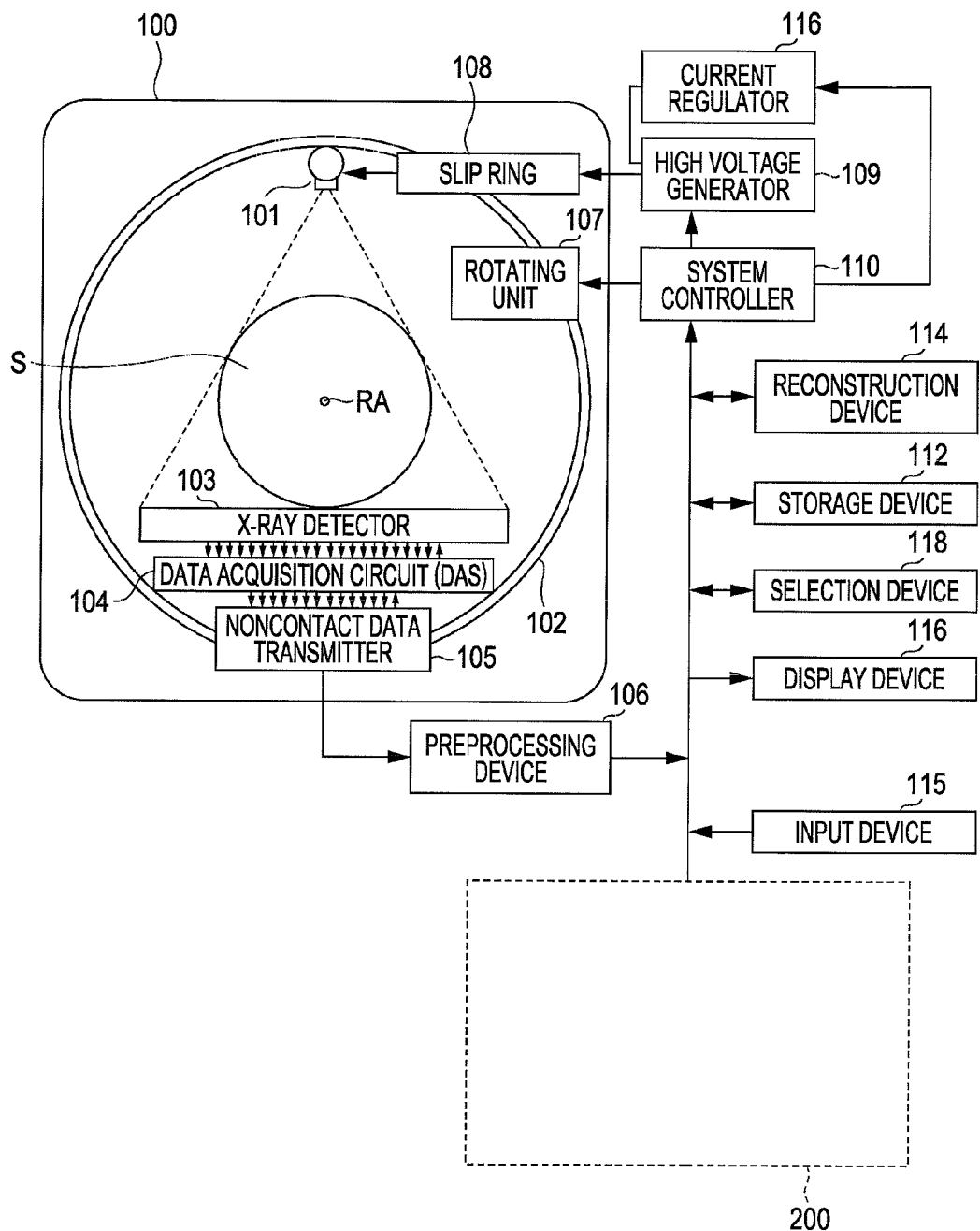
FIG. 2 is a diagram illustrating one embodiment of the multi-slice X-ray CT apparatus or scanner according to the current invention.

Referring now to the drawings, wherein like reference numerals designate corresponding structures throughout the views, and referring in particular to FIG. 2, a diagram illustrates one embodiment of the multi-slice X-ray CT apparatus or scanner according to the current invention including a gantry 100 and other devices or units. The gantry 100 is illustrated from a side view and further includes an X-ray tube 101 and a multi-row or two-dimensional array type X-ray detector unit 103. The X-ray tube 101 and X-ray detector unit 103 are diametrically mounted across a subject S on an annular frame 102, which is rotatably supported around a rotation axis RA. A rotating unit 107 rotates the frame 102 at a high speed such as 0.4 sec/rotation while the subject S is being moved along the axis RA into or out of the illustrated page in order to perform a helical scan.

The multi-slice X-ray CT apparatus further includes a high voltage generator 109 that applies a tube voltage to the X-ray tube 101 through a slip ring 108 so that the X-ray tube 101 generates X ray. The X rays are emitted towards a subject whose cross sectional area is represented by a circle. The X-ray detector 103 is located at an opposite side from the X-ray tube 101 across the subject for detecting the emitted X rays that have transmitted through the subject.

Still referring to FIG. 2, the X-ray CT apparatus or scanner further includes other devices for processing the detected signals from X-ray detector unit 103. A data acquisition circuit or a Data Acquisition System (DAS) or data acquisition unit 104 reads from the X-ray detector unit 103 a signal output for each row at a time with a read out delay of approximately 6 micro seconds between the two rows of the detectors. The DAS 104 converts the output signal for each channel into a voltage signal, amplifies it, and further converts it into a digital signal. The X-ray detector 103 and the DAS 104 are configured to handle a predetermined total number of projections per rotation (TPPR) that can be at the most 900 TPPR, between 900 TPPR and 1800 TPPR and between 900 TPPR and 3600 TPPR.

The above projection raw data is sent to a preprocessing device 106, which is housed in a console outside the gantry 100 through a non-contact data transmitter 105. The preprocessing device 106 performs certain corrections such as sensitivity correction on the raw data. A storage device 112 then stores the resultant data that is also called projection data at a stage immediately before reconstruction processing. The storage device 112 is connected to a system controller 110 through a data/control bus, together with a reconstruction device 114, display device 116, input device 115, and the scan plan support apparatus 200. The scan plan support apparatus 200 includes a function for supporting an imaging technician to develop a scan plan.

In one embodiment according to the current invention, a selection unit or device 118 further includes various software and hardware components and selects a certain desirable portion of the projection data before the reconstruction unit or device 114 processes the selected projection data. According to one aspect of the current invention, the selection device 118 of the CT apparatus advantageously selects a portion of the helical scanned projection data so as to substantially reduce undesirable artifacts due to motion of the heart. In general, the selection device 118 in one embodiment of the current invention operates on the projection data to determine pairs of top complementary rays and or bottom complementary rays and determines an absolute sum of difference for top complementary rays and or bottom complementary rays. The selection device 118 further filters and shifts the absolute sum of difference in order to construct a motion map in an accurate manner. Finally, the selection device 118 selects a desirable portion of the projection data based on the least amount of the previously determined absolute sum of difference in top complementary rays and or bottom complementary rays.

Figure 3:
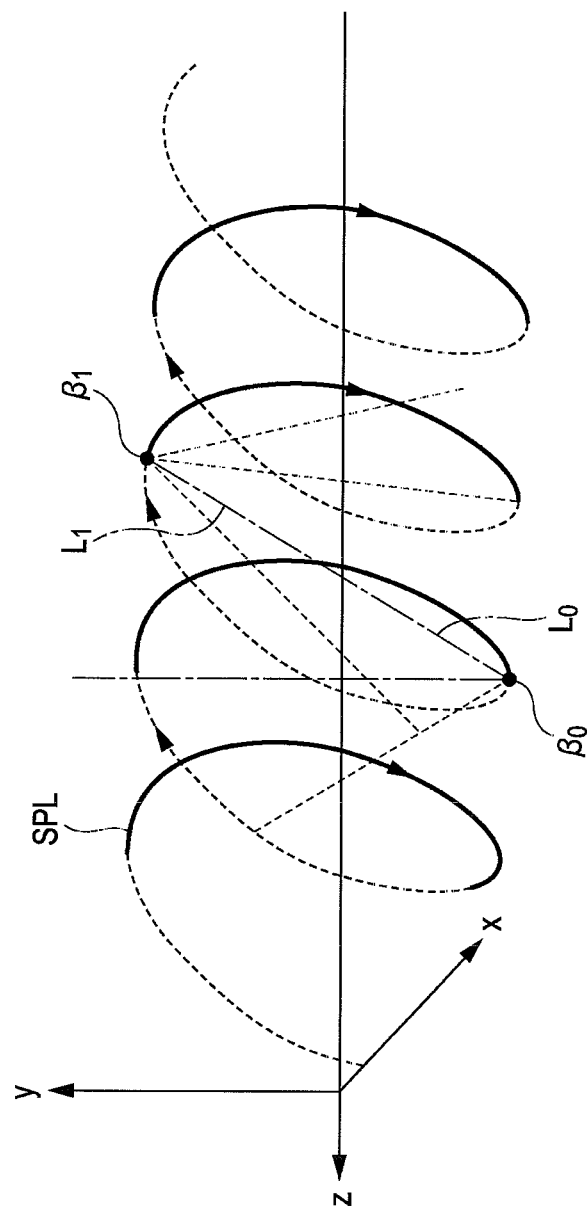
FIG. 3 is a diagram conceptually illustrating a pair of complementary rays in relation to other rays in helical scan according to one embodiment of the current invention.

Now referring to FIG. 3, a diagram conceptually illustrates complementary rays in relation to other rays during helical scan according to the current invention. For the sake of simplicity, the diagram does not include the heart of a patient or components of a CT scanner and illustrates only rays and a hypothetical helical path in three dimensions. The x, y and z directions in the diagram are respectively indicated by the corresponding arrows, and the z direction indicates the helical scanning direction or the patient table movement. A spiral line SPL indicates the helical path where the projection views are taken by X-ray as the gantry rotates around a patient while the patient table advances. As shown by the spiral line SPL, the rays are not perpendicular to the z axis due to the helical scan. For the purpose of illustrating a pair of complementary rays, the diagram shows only arbitrarily selected rays in dotted straight lines.

Still referring to FIG. 3, within any one complete rotation in the helical projection, there are either one pair or two pairs of complementary rays that are used to examine an amount of coronary movement according to the current invention. In FIG. 3, only one exemplary pair of complementary rays $L_0$ and $L_1$ is illustrated in the helical projection. The complementary rays $L_0$ and $L_1$ are defined to be located on a π (PI) boundary of projections whose source locations $\beta_0$ and $\beta_1$ that are (180+δ) degrees apart. The angle δ depends on how far the rays are away from the central ray. That is, if there were absolutely no coronary movement, the ray path lengths of the complementary rays $L_0$ and $L_1$ would be identical in the helically acquired projection data.

Figure 4:
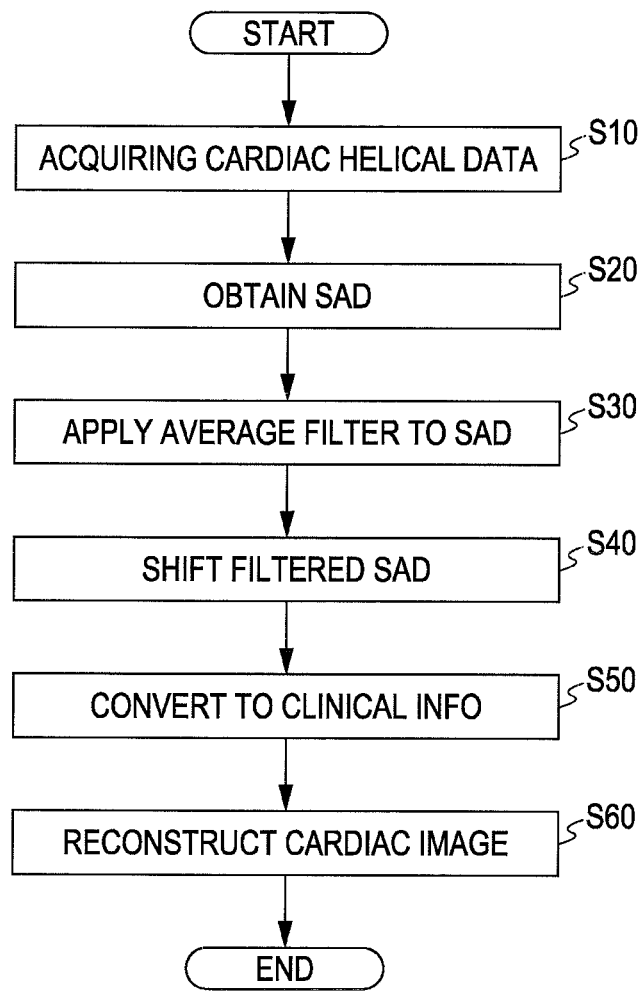
FIG. 4 is a flow chart illustrating general steps involved in an operation of determining a portion of helically scanned data having the least amount of coronary movement according to one process of the current invention.

Now referring to FIG. 4, a flow chart illustrates general steps involved in a preferred process of determining a portion of helically scanned data having the least amount of coronary movement according to the current invention. In general, projection data are acquired using a helical scan technique in a step S10. As the helical projection data are obtained, electrical cardiogram (ECG) information is embedded in the projection data to indicate relative positions with respect to the R peak of each hear beat. In certain situations, the X-ray may be triggered based upon predetermined R-to-R peak information in order to limit the exposure during the helical data acquisition.

The step 10 according to the current invention acquires projection data at a relatively high pitch during the helical scan for later determining the optical cardiac phase. According to one preferred process, although high pitches may be approximately 0.2, they may also be above 0.3 provided that the pitch is such that the PI boundary falls within or on the real detector size limitation. In contrast, certain above discussed prior art techniques required low pitches between 0.1 and 03 during helical scan since at least low-resolution images were reconstructed from projection data in order to determine the optical cardiac phase. Due to the low pitch requirement, the prior art helical scan resulted in a relatively high X-ray exposure to the patient and a relatively long scan time. Because of the high pitch helical mode, the step 10 according to the current invention has reduced the patient X-ray exposure and a scan time in acquiring helical projection data to be used for the optimal cardiac phase determination according to the current invention. The reduced patient X-ray exposure and scan time are advantageous in patient care. Obviously, the reduced X-ray dose promotes patient safety while the shorter scan time also enhances patient comfort. In addition, the shorter scan time enhances a quality of the scanned data as patients can more readily restrain their body movement during a short period of time.

A step S20 calculates Sum of Absolute Difference (SAD) of views in the above helical data as acquired in the step S10. The SAD for a view is the sum of absolute difference across channels as defined below:

$$\text{sum[view]} = \sum_{ch} \text{abs}(\textit{diff}[ch, \text{view}])$$

The summation channel range is those channels that cover the rays for complementary views. In the preferred process, the SAD is an absolute sum of differences of rays on the PI boundary curves with their complementary rays. The SAD value indicates inconsistency in views caused by motion of the heart. As will be further described later, these pairs of the complementary views each include a direct ray and a corresponding complementary ray. In this specification, the direct ray may be interchangeably used with a primary ray or a real ray while the corresponding complementary ray may be interchangeably used with a taiko ray. In this regard, the direct ray may be also termed as a current ray while the corresponding complementary ray may be a subsequent ray or a previous ray depending upon their mutual temporal relations.

For these reasons, SAD is further defined as $SAD_{top}$ and $SAD_{bottom}$. SAD is determined as $SAD_{top}$ when the direct ray is the current ray and the corresponding complementary ray is subsequently sampled in the helical data acquisition. By the same token, SAD is determined as $SAD_{bottom}$ when the direct ray is the current ray and the corresponding complementary ray is previously sampled in the helical data acquisition. In the step S20, either or both of $SAD_{top}$ and $SAD_{bottom}$ is determined according to the current invention. In the following description of the preferred process, both the $SAD_{top}$ and $SAD_{bottom}$ data are assumed.

Still referring to FIG. 4, a step 30 applies an average filter to the SAD profiles. As will be further described later, this filtering is necessary when either or both $SAD_{top}$ and $SAD_{bottom}$ are calculated in the step S20. In general, although the SAD value indicates inconsistency or coronary movement, the values of $SAD_{top}$ and $SAD_{bottom}$ are not identical over views due to the temporal discrepancy in the complementary rays. Thus, they need be smoothed out by applying an average filter to the $SAD_{top}$ and $SAD_{bottom}$ profiles before shifting the two SAD values. In one preferred embodiment, a weighted sum is generated by applying the filter for filtering the sum gamma difference. According to one preferred embodiment, an optimal filter length is 0.5 times the number of views per revolution.

A step S40 shifts the above filtered SAD data from the step S30. In other words, the weighted sum curves for $SAD_{top}$ and $SAD_{bottom}$ are shifted by a certain amount so as to match the SAD curves to the motion phase. The shifting facilitates to visually confirm whether or not both weighted sum $SAD_{top}$ and $SAD_{bottom}$ curves have a maximal amount of inconsistency around the X-ray on and off boundaries while they are also identical with each other for accuracy. When it is confirmed in the step S40 that both weighted sum $SAD_{top}$ and $SAD_{bottom}$ curves are substantially accurate, the lowest inconsistency generally indicates the least amount of the coronary movement in certain views.

A step S50 converts the above determined inconsistency data into clinically relevant information. That is, the above determined inconsistency data is shown in a cardiac motion map in terms of percentage of the heart cycle or cardiac phase ranging from 0 to 100. For example, a motion map is used to determine an optimal cardiac phase in the heart cycle in reference to the R-R peak of ECG so as to select corresponding portions of the projection data that would be minimally impacted by the cardiac motion artifacts during reconstruction.

A step S60 finally generates cardiac images according to a predetermined reconstruction algorithm using the helically scanned projection data that corresponds to the above selected optimal phase. In order to reconstruct an optimal image, the step S60 advantageously utilizes the embedded ECG information, which is extracted from the helical projection data. The extracted ECG information is stored in an ECG table so that relevant projection data is retrieved for reconstruction during the step 60 based upon the clinically relevant information form the Step S50. In general, the reconstructed cardiac images are substantially free from the motion artifacts. At the same time, since the optimal phase determination is made in the data domain, the operation of the preferred process is computationally efficient in comparison to prior art techniques using the image domain data.

Still referring to FIG. 4, although the above described preferred process utilizes both the $SAD_{top}$ and $SAD_{bottom}$ data, another preferred process utilizes only either one of the $SAD_{top}$ and $SAD_{bottom}$ data in determining the optimal cardiac phase. In any case, the above steps 30 and 40 are necessarily performed for confirming accuracy in the optimal phase selection.

Figure 5:
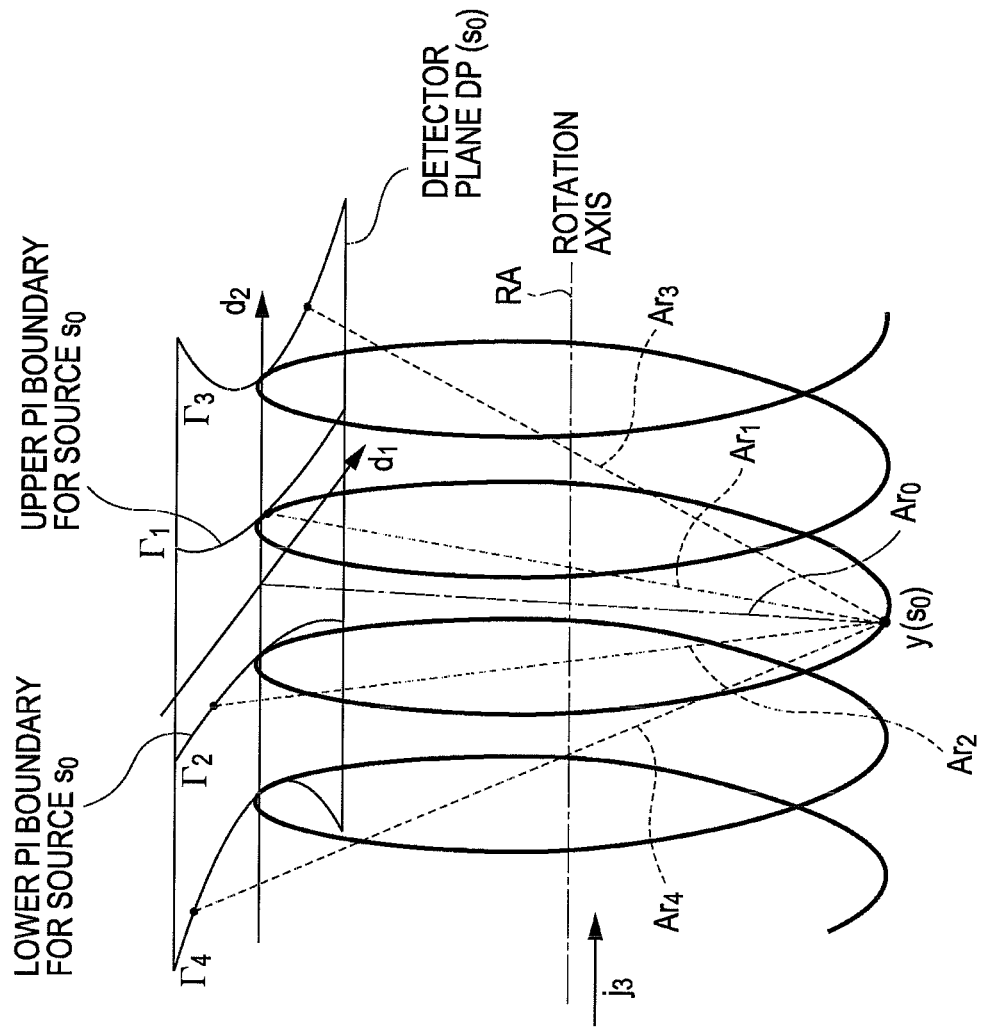
FIG. 5 is a diagram illustrating certain aspects of the helical data acquisition including individual rays in relation to the PI boundaries according one embodiment of the current invention.

In the following, each of the steps S10 through S60 is further described with respect to other drawings. Now referring to FIG. 5, certain aspects of the helical data acquisition step S10 are shown in a diagram in order to illustrate individual rays in relation to the PI boundaries. An arrow j3 indicates the direction of the patient table movement along an rotational axis RA, around which the X-ray source rotates in a helical path C. While the X-ray source is at the position $y(S_0)$ in the helical path C, five individual rays are exemplarily illustrated in dotted lines towards a detector plane $DP(S_0)$. In the drawing, the central array $A_{r0}$ scans along the surface of the detector plane DP in a direction as indicated by an arrow $d_1$ while adjacent rays $Ar_1$ and $Ar_2$ respectively form a upper PI boundary $\Gamma_1$ and a lower PI boundary $\Gamma_2$ for the X-ray source at the $y(S_0)$. On the detector plane $DP(S_0)$, the upper PI boundary $\Gamma_1$ and the lower PI boundary $\Gamma_2$ are each located a half turn plus $\delta$ from the position y(S0) along the source trajectory, where the degree $\delta$ depends upon how far the ray is away from the central ray.

The upper PI boundary $\Gamma_1$ and the lower PI boundary $\Gamma_2$ together define a PI window. Since the PI window is formed by projection of the source trajectory, its size is related to a helical speed. That is, the higher the helical pitch is, the larger the PI window becomes. It is important to note that the pitch or the patient table speed is such that the PI window falls within or on the real detector size limitation.

Figure 6A:
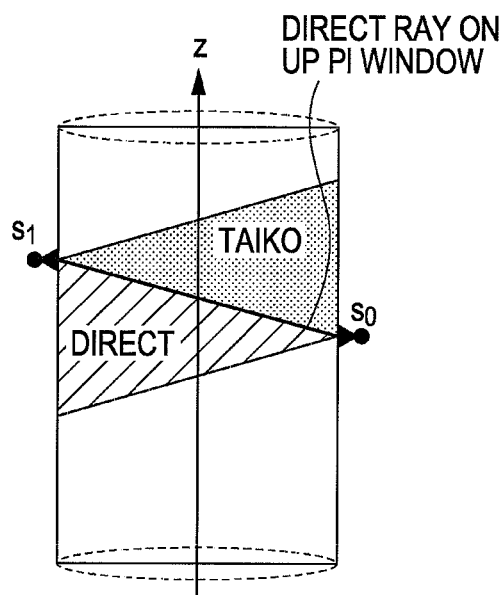
FIG. 6A is a schematic top view illustrating the UP PI window when the direct rays from the source position are the current rays and the corresponding complementary (Taiko) rays are subsequently sampled from the later source position according one embodiment of the current invention.
Figure 6B:
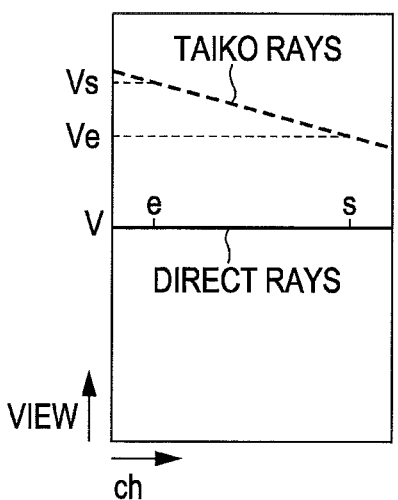
FIG. 6B is a sinogram for the UP PI window illustrating a relationship between channels and views during the helical data acquisition according one embodiment of the current invention.

Now referring to FIGS. 6A and 6B, diagrams illustrate certain relationships between a direct ray and a complementary ray on the PI boundary when the direct ray is on the UP PI window. That is, as illustrated in a schematic top view of FIG. 6A, the UP PI window is defined when the direct rays from the source position $S_0$ are the current rays and the corresponding complementary (Taiko) rays are subsequently sampled from the source position $S_1$. As indicated by a solid line, a first PI boundary line of the direct rays shares the second PI boundary line of the complementary rays on the UP PI window. An arrow indicates the z direction along the movement of a patient table during the helical data acquisition.

FIG. 6B is a sinogram for the above described UP PI window. The sonogram illustrates a relationship between channels and views during the helical data acquisition. For the direct rays, the view is the same across the channels. On the other hand, for the complementary rays, the views vary as the channels change. That is, the complementary views and channels have to be calculated according to the channels of the direct rays in order to determine the Sum of Absolute Difference (SAD) of views in the above helical data as acquired in the step S10 in the preferred process of FIG. 4. The direct ray [s,V] to [e,V] corresponds to the Taiko ray [e,Vs] to [s,Ve].

Accordingly, for the above described UP PI window, $SAD_{top}$ is determined based upon the direct rays and the complementary rays as follows when the direct rays are the current rays and the corresponding complementary rays are subsequently sampled in the helical data acquisition.

$$SAD_{top}[\text{view}] = \sum_{ch} \text{abs}(direct_{top}[ch, \text{view}] - comp_{bot}[ch, \text{view}])$$

where $direct_{top}$ is projection data for the direct rays on the UP PI window while $comp_{bot}$ is projection data for the complementary rays on the DOWN PI window.

Figure 7A:
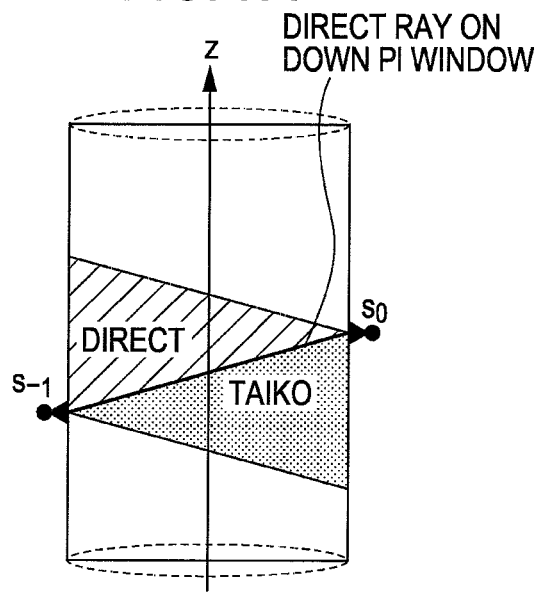
FIG. 7A is a schematic top view illustrating the DOWN PI window when the direct rays from the source position are the current rays and the corresponding complementary (Taiko) rays are previously sampled from the earlier source position according one embodiment of the current invention.

Now referring to FIG. 7A, as illustrated in a schematic top view of the DOWN PI window is defined when the direct rays from the source position $S_0$ are the current rays and the corresponding complementary (Taiko) rays are previously sampled from the source position $S_{-1}$. As indicated by a solid line, a first PI boundary line of the direct rays shares the second PI boundary line of the complementary rays on the DOWN PI window. An arrow indicates the z direction along the movement of a patient table during the helical data acquisition.

Figure 7B:
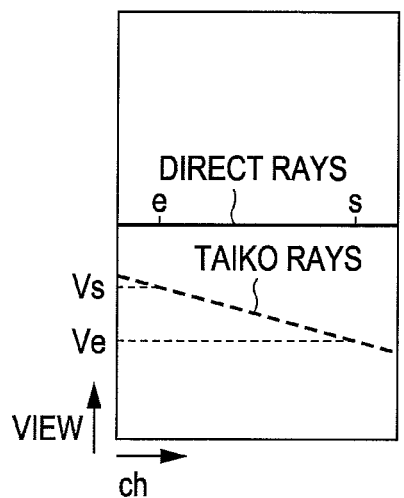
FIG. 7B is a sinogram for the above described DOWN PI window illustrating a relationship between channels and views during the helical data acquisition according one embodiment of the current invention.

FIG. 7B is a sinogram for the above described DOWN PI window. The sonogram illustrates a relationship between channels and views during the helical data acquisition. For the direct rays, the view is the same across the channels. On the other hand, for the complementary rays, the views vary as the channels change. That is, the complementary views and channels have to be calculated according to the channels of the direct rays in order to determine the Sum of Absolute Difference (SAD) of views in the above helical data as acquired in the step S10 in the preferred process of FIG. 4. The direct ray [s,V] to [e,V] corresponds to the Taiko ray [e,Vs] to [s,Ve].

Accordingly, for the above described DOWN PI window, $SAD_{bottom}$ is determined based upon the direct rays and the complementary rays as follows when the direct rays are the current rays and the corresponding complementary rays are previously sampled in the helical data acquisition.

$$SAD_{bottom}[\text{view}] = \sum_{ch} \text{abs}(direct_{bot}[ch, \text{view}] - comp_{top}[ch, \text{view}])$$

where $direct_{bot}$ is projection data for the direct rays on the DOWN PI window while $comp_{top}$ is projection data for the complementary rays on the UP PI window.

Figure 8:
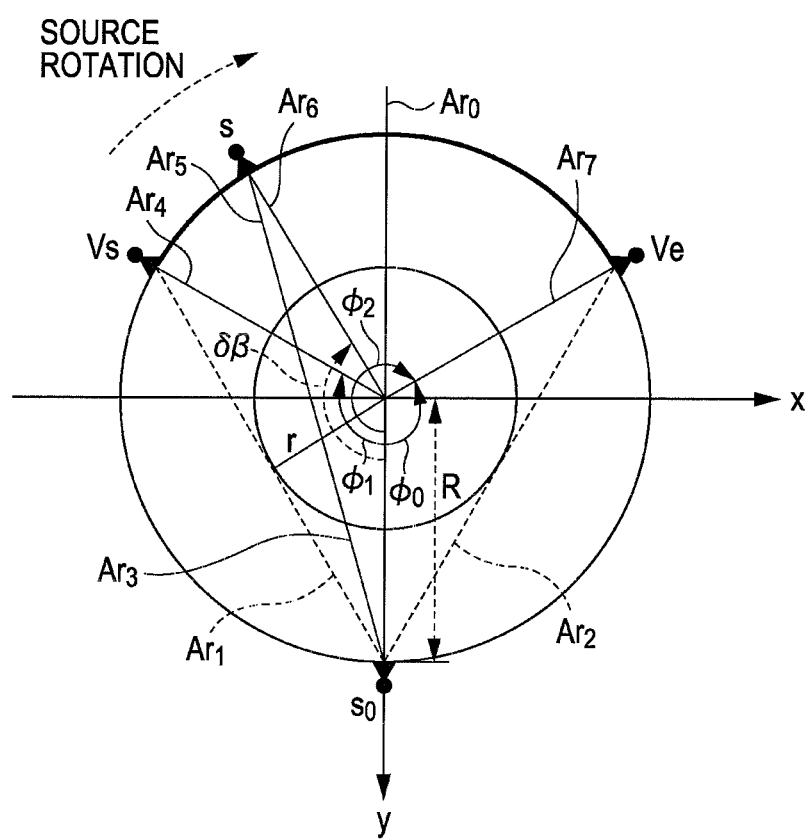
FIG. 8 is a diagram illustrating PI boundaries on a X-Y plane according one embodiment of the current invention.

Now referring to FIG. 8, a diagram further illustrates the PI boundaries on a X-Y plane according to the current invention. When the X-ray source is at a $S_0$ position, it is assumed that the source trajectory from the $S_0$ position forms the upper and lower PI boundaries respectively at complementary views Vs and Ve for primary rays $A_{r1}$ and $A_{r2}$ respectively through channel s and e. On upper and lower PI boundaries, the region between Vs and Ve is required for the field view. It is also assumed that an angular difference $\delta\beta$ between the source positions $S_0$ and S satisfies the following three conditions when the X-ray source is at the S position.

$$\Phi_1 \leq \delta\beta \leq \Phi_2$$

$$\Phi_2 = 2\pi - \Phi_1$$

$$\Phi_1 = 2 \times \cos^{-1}(r/R)$$

where $\Phi_1$ is an angle between arrays $A_{r0}$ and $A_{r4}$ while $\Phi_2$ is an angle between arrays $A_{r0}$ and $A_{r7}$ as indicated in FIG. 8. r is a radius of a circular area indicating FOV (Field of View), which is to be reconstructed on a x-y plane, and R is a radius for source trajectory. All the rays for channel s to channel e are necessary to cover the view field with a radius r. Based upon the above conditions, a view range on the lower PI boundary is defined as follows:

$$V_s = S_0 - \text{ViewRev} + (\Phi_1/2\pi) \times \text{ViewRev}$$

$$V_e = V_s + ((\Phi_2 - \Phi_1)/2\pi) \times \text{ViewRev}$$

where a starting view $V_s$ and an ending view $V_e$ are the complementary views for the two extreme rays from source at $S_0$. The two extreme rays are tangent to the circle indicating FOV or the reconstructed area. The complementary views $V_s$ and $V_e$ are both expressed in terms of a number of views, i.e. how many views from the view at $S_0$.

By the same token, a view range on the upper PI boundary is defined as follows:

$$V_s = S_0 + (\Phi_1/2\pi) \times \text{ViewRev}$$

$$V_e = V_s + ((\Phi_2 - \Phi_1)/2\pi) \times \text{ViewRev}$$

where a starting view $V_s$ and an ending view $V_e$ are the complementary views for the two extreme rays from source at $S_0$. The two extreme rays are tangent to the circle indicating FOV or the reconstructed area. The complementary views $V_s$ and $V_e$ are both expressed in terms of a number of views, i.e. how many views from the view at $S_0$.

Figure 9B:
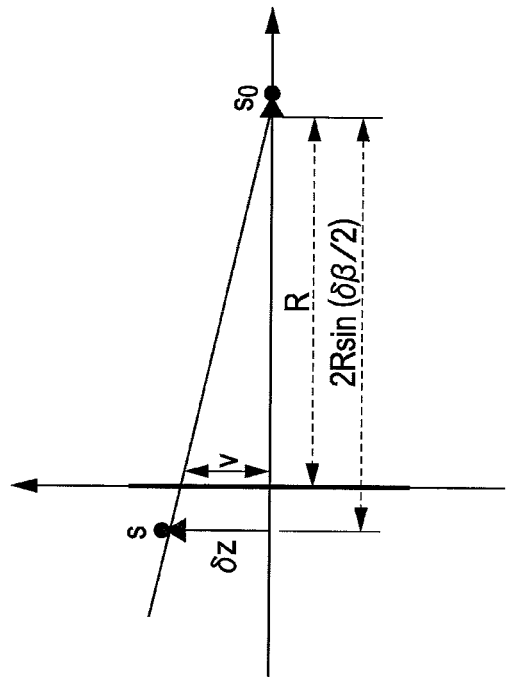
FIGS. 9A and 9B are diagrams further illustrating a particular position on the PI boundary respectively on a X-Y plane and a Y-Z plane according one embodiment of the current invention.
Figure 9A:
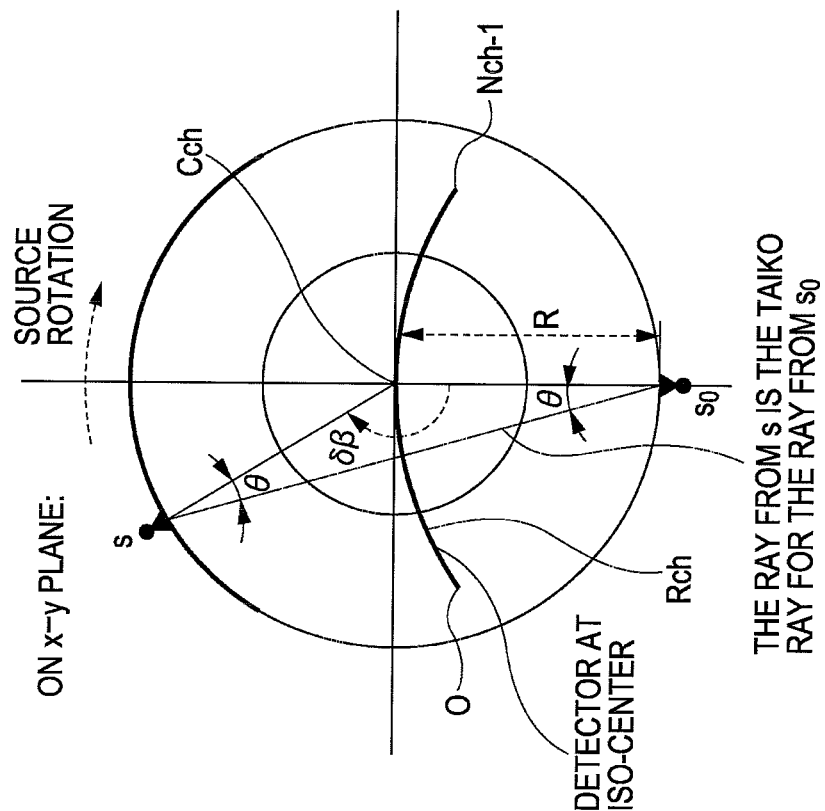

Referring to FIGS. 9A and 9B, the two diagrams further illustrate as to how to find a particular position on the PI boundary respectively on a X-Y plane and a Y-Z plane according to the current invention. Now referring to FIG. 9A, a detector area is at an iso-center as illustrated by an arc in a thick line. The detector area is defined to have a predetermined number of channels Nch ranging from 0 to Nch−1 in each segment of the detector. When the X-ray source is at a $S_0$ position, it is assumed that a ray emitted from a position S is complementary to a corresponding ray from the $S_0$ position. It is also assumed that an angular difference $\delta\beta$ between the source positions $S_0$ and $S$ is related to an angle $\theta$ in the following two equations:

$$R\cos(\theta) = R\sin(\delta\beta/2)$$

$$\theta = \cos^{-1}(\sin(\delta\beta/2))$$

Thus, the particular position S on the PI boundary is defined as follows:

$$h_{ch} = Cch + (\theta/\delta\gamma)$$

where Cch is the central channel number whose detector detects the x-ray from either source position S or S0 that goes through the center of rotation while $h_{ch}$ is the channel number whose detector detects the x-ray that forms the angle $\theta$ to the x-ray detected by the detector Cch, $\delta\gamma$ is defined to be an angle per channel or a fan angle that is divided by a number of channels.

Now referring to FIG. 9B, when the X-ray source is at the $S_0$ position, a distance $\delta z$ and a distance v on the detector are determined both in the z direction on the Y-Z plane in the following manner. When a primary ray from the position S0 to the channel hch forms the angle $\theta$ with the ray through the channel Cch, its complementary ray to the top PI boundary from the position S has a distance $\delta z$ due to the helical motion. The distance V is calculated so that the vertical distance of the top PI boundary position of the channel hch is determined on the detector for a complementary view for each channel. Although the unit of the distance v is in millimeter, if the couch speed CS is also mm/rev, the unit can be converted into segments or channel number.

$$\frac{v}{\delta z} = \frac{R}{2R\sin(\delta\beta/2)}$$
$$= \frac{1}{2\sin(\delta\beta/2)}$$
$$v = \frac{(\delta\beta/2\pi) \times CS}{2\sin(\delta\beta/2)}$$

where if CS is defined to a couch speed in mm/rev, v is in mm.

Figure 10A:
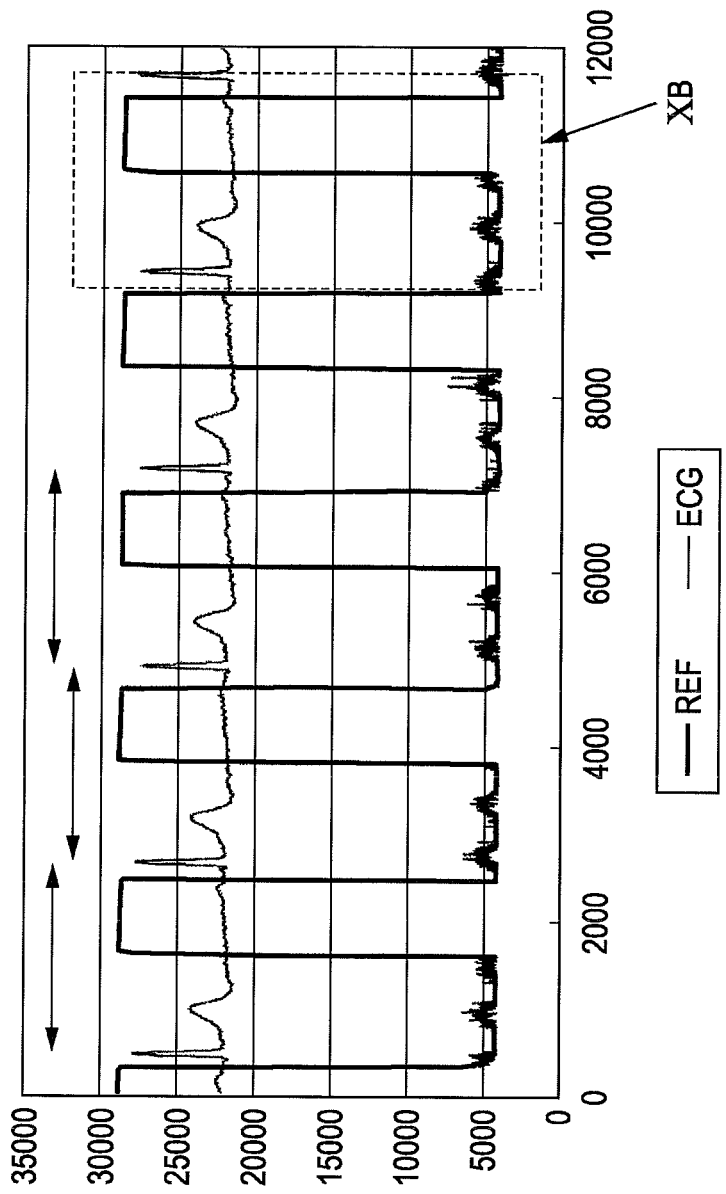
FIG. 10A is a graph showing ECG and X-ray on and off positions with respect to the views according one embodiment of the current invention.

To understand certain clinical significance of the above discussed subject matter, referring to FIG. 10A, the graph shows ECG and X-ray on and off positions with respect to the views. The X-ray on and off positions are determined in relation to certain peaks of the ECG data. During a period of the X-ray on, as seen in FIG. 10B, a portion of the graph in FIG. 10A is enlarged to show that a pair of the X-ray on and off positions spans over approximately 1000 views. Since the X-ray on and off view positions should yield maximum data inconsistency for the direct and complementary data, the X-ray on and off view positions are desirable landmarks to calibrate parameters for a cardio motion map (Mmap) in real clinical data.

Figure 11:
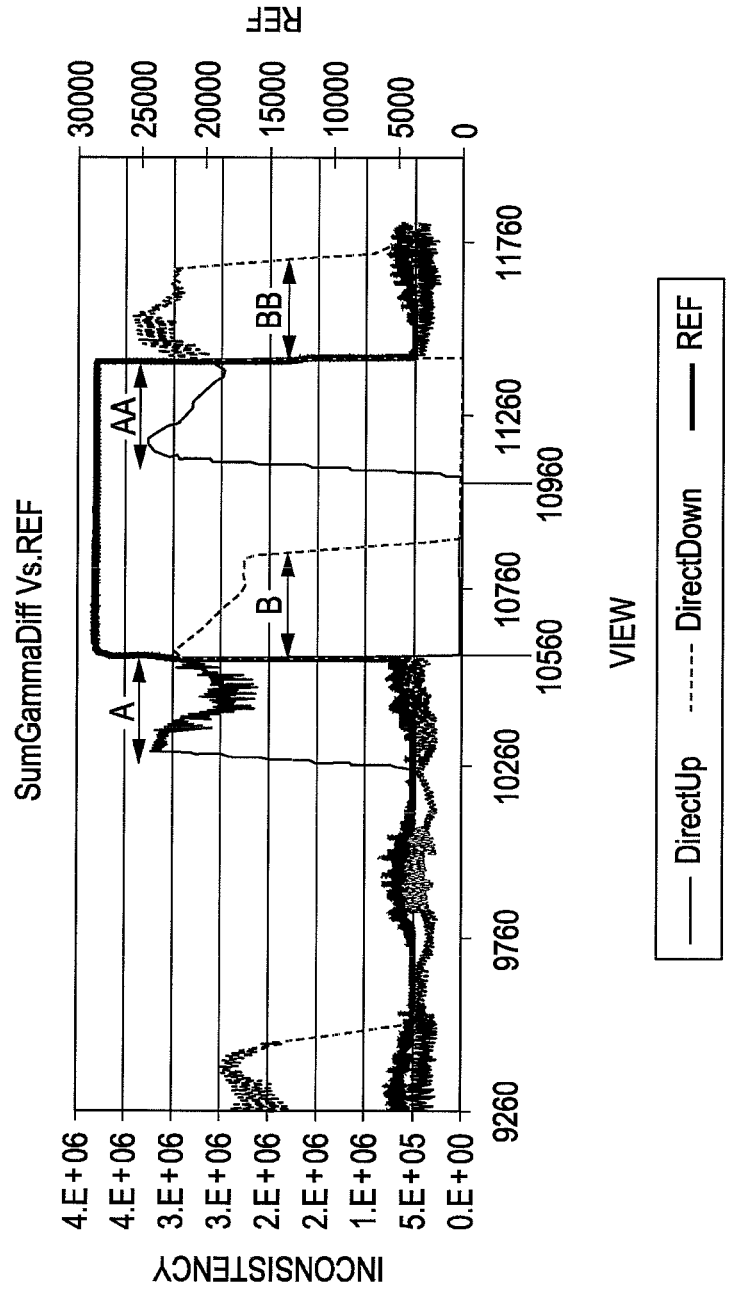
FIG. 11 is a graph depicting a relationship between views and inconsistency based upon the direct and complementary rays on the PI window according one embodiment of the current invention.

Now referring to FIG. 11, a graph depicts a relationship between views and inconsistency based upon the direct and complementary rays on the PI window according to the current invention. The widths A and AA indicate the maximal inconsistency regions for $SAD_{top}$, which has been determined for the above described UP PI window based upon the direct rays and the complementary rays when the direct rays are the current rays and the corresponding complementary rays are subsequently sampled during the helical data acquisition. By the same token, the widths B and BB indicate the maximal inconsistency regions for $SAD_{bottom}$, which has been determined for the above described DOWN PI window based upon the direct rays and the complementary rays when the direct rays are the current rays and the corresponding complementary rays are previously sampled during the helical data acquisition. The graph also includes X-ray on and off positions with respect to the views.

Since the X-ray on and off view positions should yield maximum data inconsistency for the direct and complementary data, the X-ray on and off view positions are desirable landmarks to calibrate parameters for a cardio motion map (Mmap) in real clinical data. The PI-boundary data difference curves are synonymous with the view-inconsistency curves including the widths A, AA, B and BB. For these reasons, the PI-boundary data difference curves are manipulated so as to form a reliable Mmap curve. In one preferred process according to the current invention, the manipulation includes filter averaging and shifting of the PI-boundary data difference curves.

To determine a filter length for averaging, one can estimate based upon the values shown in the graph in FIG. 11. For example, an approximate average view difference between the maximal inconsistency regions A and AA is around one half of the number of views per revolution, and the size of the width (0.5 times views per revolution) is a good candidate for smoothing the view inconsistency curves. In this regard, with 600 views per revolution, 300 views is used as a filter length FltL in one preferred process. In addition, the filtering is made with a weight function w as follows:

$$Mmap[v] = \sum_{i=-FltL}^{FltL} SAD[v-i] \times w[i+FltL]$$

where v is a view and FltL is a filter length based upon 0.5 times the number of views per revolution. The weight function w is either an average or a Gaussian weighting function in one preferred process. SAD is either $SAD_{top}$ or $SAD_{bottom}$ as previously defined in the current specification.

Figure 12:
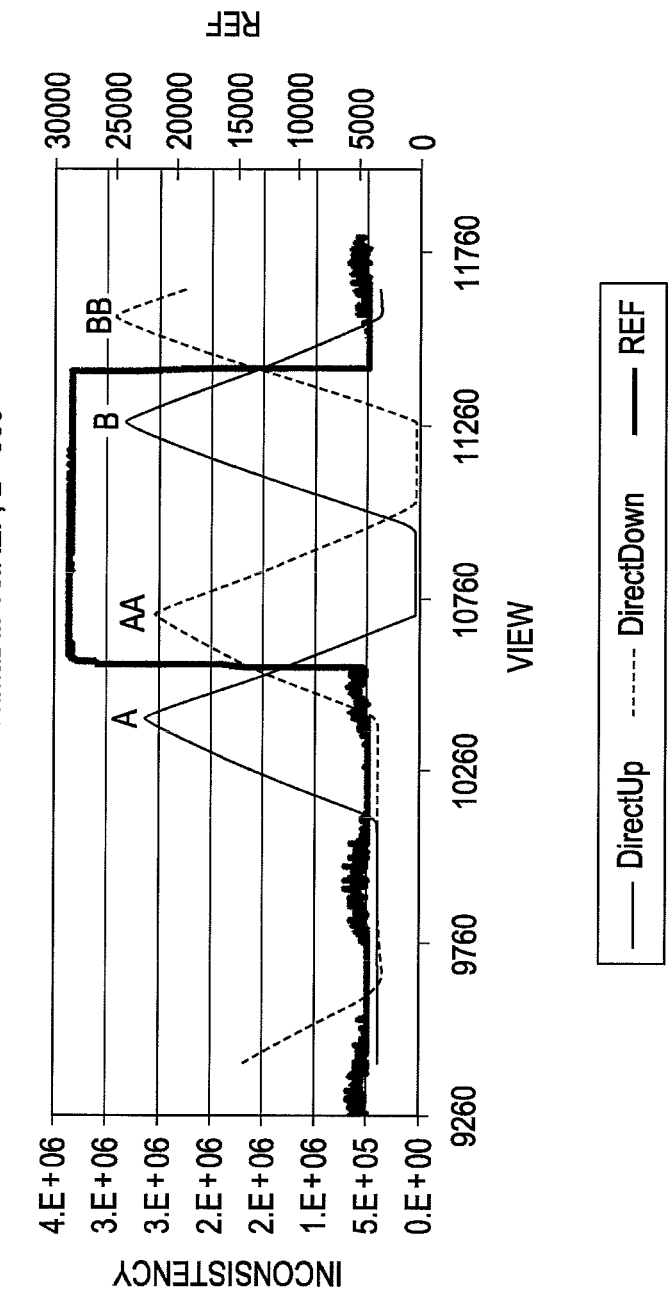
FIG. 12 is a graph indicating the PI-boundary data difference data or the weighted sum curves that have undergone filtering according one embodiment of the current invention.

FIG. 12 is a graph indicating the PI-boundary data difference data or the weighted sum curves that have undergone the above described filtering according to the current invention. Although both the weighted PI-boundary data difference data $SAD_{top}$ and $SAD_{bottom}$ more prominently show the maximal inconsistency substantially near the X-ray on and off view positions, they still do not match the X-ray on and off view positions. A final step of the manipulation is to shift the weighted PI-boundary data difference data $SAD_{top}$ and $SAD_{bottom}$ towards the X-ray on and off view positions in opposite directions by a certain amount. In the above described preferred process, an approximate view difference between the maximal inconsistency regions A and AA is 150 in the weighted sum curves.

Figure 13:
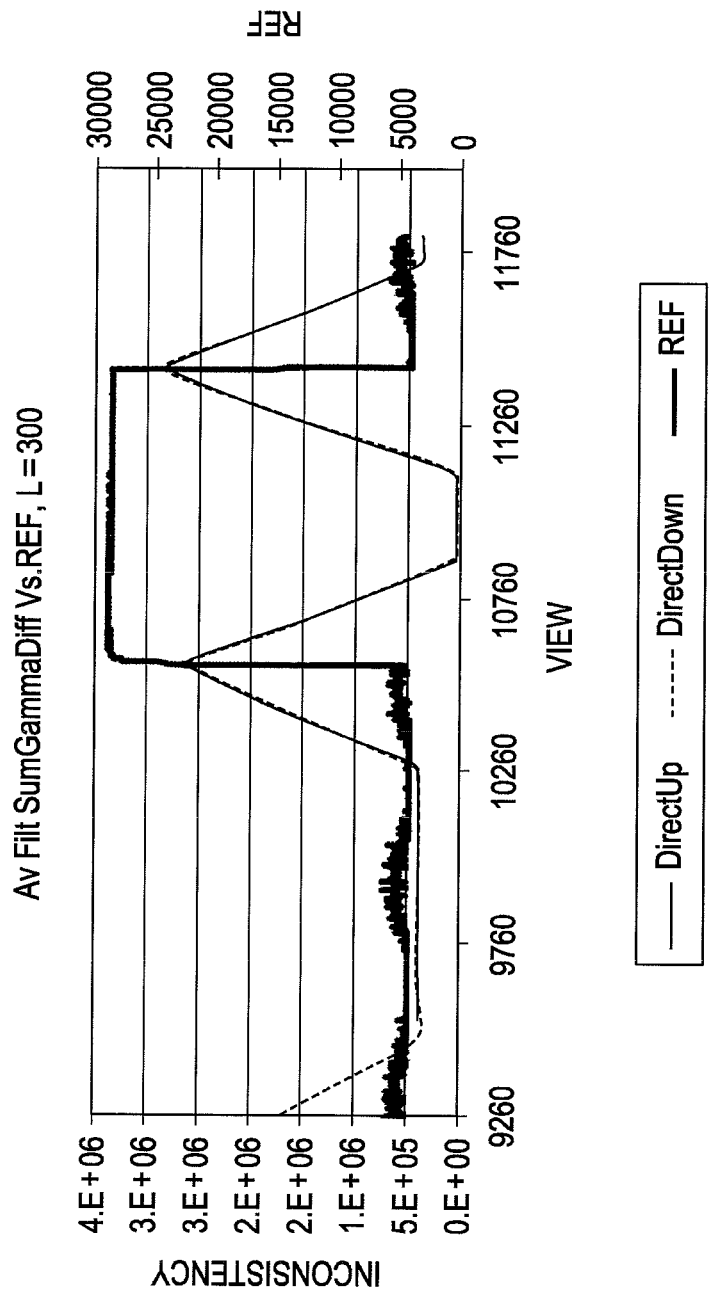
FIG. 13 is a graph indicating the PI-boundary data difference data or the weighted sum curves that have undergone shifting according one embodiment of the current invention.

FIG. 13 is a graph indicating the PI-boundary data difference data or the weighted sum curves that have undergone the above described shifting according to the current invention. The weighted sum curves of FIG. 12 have been shifted by 150 views in the weighted sum curves. According to the current invention, this particular number of views corresponds to approximately one fourth of the number of views per revolution. That is, the weighted PI-boundary data difference data $SAD_{top}$ and $SAD_{bottom}$ have been shifted in the manner as define by the following equation:

$$SAD[\text{view}] = SAD_{top}\left[\text{view} + \frac{ViewPerRev}{4}\right] + SAD_{bot}\left[\text{view} - \frac{ViewPerRev}{4}\right]$$

where ViewPerRev is the number of views per revolution.

Figure 14:
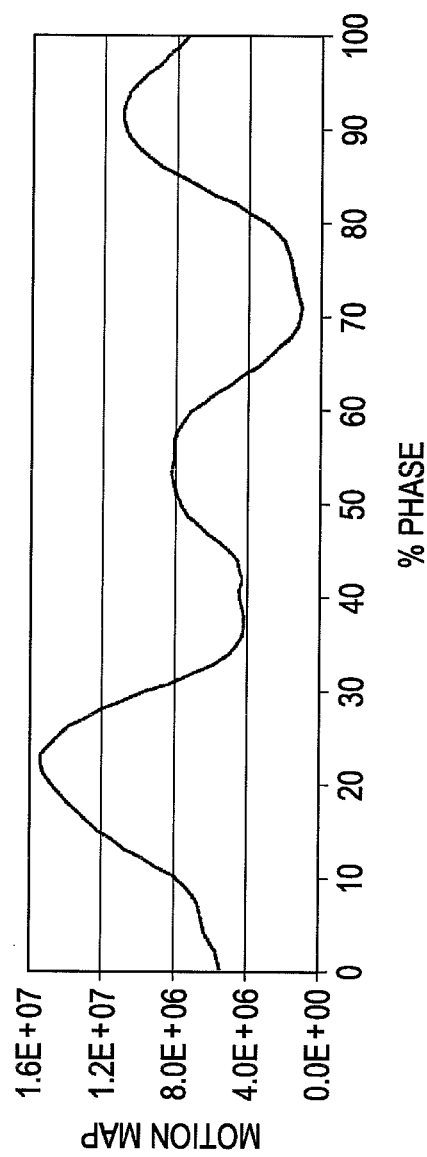
FIG. 14 is a graph indicating a motion map as generated from the shifted and weighted PI-boundary data difference data $SAD_{top}$ and $SAD_{bottom}$ according one embodiment of the current invention.

Now referring to FIG. 14, a graph indicates a motion map as generated from the shifted and weighted PI-boundary data difference data $SAD_{top}$ and $SAD_{bottom}$ according to the current invention. The motion map shows the optimal cardiac phase for the least amount of inconsistency in the shifted and weighted PI-boundary data difference data $SAD_{top}$ and $SAD_{bottom}$. That is, the motion map indicates the optimal cardiac phase such as near the end systolic phase and the mid diastolic phase when the cardiac movement is the least. The optimal cardiac phase is clinically referenced so that the corresponding projection data would be reconstructed to have images that are substantially free from the motion artifacts.

The above description is a preferred embodiment for the optimal phase determination using automatic cardiac phase map generation as illustration. However, as will be broadly claimed in the claims, the current invention is applicable to other organs such as the lungs in order to improve the process and the system of selecting a portion of helical scan data and reconstructing a substantially motion-artifact free image. In addition, the current invention is also possibly applicable to other modalities other than CT scanners.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope of the inventions.

What is claimed is:

1. A method of determining the optimal phase for reconstructing a substantially motion-artifact free image from helical scan data, comprising the steps of:
    helically scanning an object using a predetermined scanner;
    determining, using a selection device, an absolute sum of differences in projection data between at least one pair of a direct view and a complementary view on at least one predetermined PI boundary, the absolute sum of differences indicating motion of the object;
    filtering the absolute sum of differences by a predetermined function;
    shifting the filtered absolute sum of differences; and
    generating a motion map based upon the shifted and filtered absolute sum of differences.

2. The method of determining the optimal phase for reconstructing a substantially motion-artifact free image from helical scan data according to claim 1 wherein the object is an organ including the heart.

3. The method of determining the optimal phase for reconstructing a substantially motion-artifact free image from helical scan data according to claim 1 wherein a pitch is over 0.3 in said helical scanning step.

4. The method of determining the optimal phase for reconstructing a substantially motion-artifact free image from helical scan data according to claim 1 wherein said absolute sum of differences includes $SAD_{top}$ based upon direct rays and complementary rays when the direct rays are current rays and the complementary rays are subsequently sampled in said helical scanning step.

5. The method of determining the optimal phase for reconstructing a substantially motion-artifact free image from helical scan data according to claim 4 wherein said $SAD_{top}$ is defined in terms of a view and a channel as follows:

$$SAD_{top}[\text{view}] = \sum_{ch} \text{abs}(direct_{top}[ch, \text{view}] - comp_{bot}[ch, \text{view}])$$

where $direct_{top}$ is projection data for the direct rays on a UP PI window while $comp_{bot}$ is projection data for the complementary rays on a DOWN PI window.

6. The method of determining the optimal phase for reconstructing a substantially motion-artifact free image from helical scan data according to claim 1 wherein said absolute sum of differences includes $SAD_{top}$ based upon direct rays and complementary rays when the direct rays are current rays and the complementary rays are subsequently sampled in said helical scanning step.

7. The method of determining the optimal phase for reconstructing a substantially motion-artifact free image from helical scan data according to claim 6 wherein said $SAD_{bottom}$ is defined in terms of a view and a channel as follows:

$$SAD_{bottom}[\text{view}] = \sum_{ch} \text{abs}(direct_{bot}[ch, \text{view}] - comp_{top}[ch, \text{view}])$$

where $direct_{bot}$ is projection data for the direct rays on a DOWN PI window while $comp_{top}$ is projection data for the complementary rays on a UP PI window.

8. The method of determining the optimal phase for reconstructing a substantially motion-artifact free image from helical scan data according to claim 1 wherein said predetermined function in said filtering step includes an averaging function, a weighting function and a Gaussian weighting function.

9. The method of determining the optimal phase for reconstructing a substantially motion-artifact free image from helical scan data according to claim 1 wherein a filter length is approximately one half of a number of views per revolution in said filtering step.

10. The method of determining the optimal phase for reconstructing a substantially motion-artifact free image from helical scan data according to claim 1 wherein an amount of shift is approximately one quarter of a number of views per revolution in said shifting step.

11. A system for determining the optimal phase for reconstructing a substantially motion-artifact free image from helical scan data, comprising:
    a data acquisition unit for helically scanning an object using a predetermined scanner;
    a selection unit operationally connected to said data acquisition unit for determining an absolute sum of differences in projection data between at least one pair of a direct view and a complementary view on at least one predetermined PI boundary, the absolute sum of differences indicating motion of the object, said selection unit filtering the absolute sum of differences by a predetermined function and shifting the filtered absolute sum of differences; and
    a reconstruction unit connected to said selection unit for generating a motion map based upon the shifted and filtered absolute sum of differences.

12. The system for determining the optimal phase for reconstructing a substantially motion-artifact free image from helical scan data according to claim 11 wherein the object is an organ including the heart.

13. The system for determining the optimal phase for reconstructing a substantially motion-artifact free image from helical scan data according to claim 11 wherein a pitch is over 0.3 in said data acquisition unit.

14. The system for determining the optimal phase for reconstructing a substantially motion-artifact free image from helical scan data according to claim 11 wherein said absolute sum of differences includes $SAD_{top}$ based upon direct rays and complementary rays when the direct rays are current rays and the complementary rays are subsequently sampled in said helical scanning step.

15. The system for determining the optimal phase for reconstructing a substantially motion-artifact free image from helical scan data according to claim 14 wherein said $SAD_{top}$ is defined in terms of a view and a channel as follows:

$$SAD_{top}[\text{view}] = \sum_{ch} \text{abs}(direct_{top}[ch, \text{view}] - comp_{bot}[ch, \text{view}])$$

where $direct_{top}$ is projection data for the direct rays on a UP PI window while $comp_{bot}$ is projection data for the complementary rays on a DOWN PI window.

16. The system for determining the optimal phase for reconstructing a substantially motion-artifact free image from helical scan data according to claim 11 wherein said absolute sum of differences includes $SAD_{top}$ based upon direct rays and complementary rays when the direct rays are current rays and the complementary rays are subsequently sampled in said helical scanning step.

17. The system for determining the optimal phase for reconstructing a substantially motion-artifact free image from helical scan data according to claim 16 wherein said $SAD_{bottom}$ is defined in terms of a view and a channel as follows:

$$SAD_{bottom}[\text{view}] = \sum_{ch} \text{abs}(direct_{bot}[ch, \text{view}] - comp_{top}[ch, \text{view}])$$

where $direct_{bot}$ is projection data for the direct rays on a DOWN PI window while $comp_{top}$ is projection data for the complementary rays on a UP PI window.

18. The system for determining the optimal phase for reconstructing a substantially motion-artifact free image from helical scan data according to claim 11 wherein said predetermined function in said filtering step includes an averaging function, a weighting function and a Gaussian weighting function.

19. The system for determining the optimal phase for reconstructing a substantially motion-artifact free image from helical scan data according to claim 11 wherein a filter length is approximately one half of a number of views per revolution in said selection unit.

20. The system for determining the optimal phase for reconstructing a substantially motion-artifact free image from helical scan data according to claim 11 wherein an amount of shift is approximately one quarter of a number of views per revolution in said selection unit.

* * * * *